United States Patent Office 3,403,125
Patented Sept. 24, 1968

3,403,125
METHOD OF CONCENTRATING AQUEOUS LATICES OF CONJUGATED DIOLEFIN-ACRYLONITRILE COPOLYMERS
Everett Steadman Graham, Sarnia, Ontario, Canada, assignor to Polymer Corporation Limited, Sarnia, Ontario, Canada, a body corporate and politic
No Drawing. Filed Oct. 21, 1965, Ser. No. 500,230
Claims priority, application Canada, Aug. 23, 1965, 938,832
13 Claims. (Cl. 260—29.7)

ABSTRACT OF THE DISCLOSURE

The excessive coagulum formation encountered when rubbery diolefin-acrylic acid nitrile copolymer latices containing more than about 20% bound nitrile monomer are subjected to concentration in the presence of agglomerating agents of the class of the product obtained by reacting a polyoxyethylene glycol with the diepoxide obtained by condensing epichlorohydrin with a polyhydric phenol, can be avoided by subjecting the latex to a heat treatment at 40° to 95° C. for a period of 48 hours to 1 minute respectively before starting the concentration step.

---

This invention relates to processes for the preparation of aqueous synthetic latices comprising a copolymer of a $C_4$-$C_6$ conjugated diolefin hydrocarbon and an acrylic acid nitrile and, more particularly, to such processes including the step of agglomerating the polymer particles to increase the average particle size thereof.

Many manufacturing processes require the use of an aqueous latex of high solids content (e.g. 60% or more) with relatively low viscosity. It is sometimes possible to polymerise directly to a high solids content, but it is more usual to produce a low solids content latex (e.g. 30–35% solids), which subsequently is concentrated. The viscosity of the latex is a function of the particle size as well as the solids content, and in many such processes the unconcentrated latex is subjected to an agglomeration step in which the average particle size is increased, resulting in a corresponding decrease in viscosity of the concentrated latex, or permitting a greater solids content to be achieved at the same viscosity. In many processes the agglomeration step is essential to permit the production of latices of the required high solids content. A problem frequently encountered is that of insufficient stability of the latex under the mechanical strains, particularly shear strains, applied thereto by the usual concentration processes, attempts to concentrate such latices by conventional methods resulting in the production of such excessive amounts of coagulum as to render the whole process uneconomic or even impossible to achieve. Coagulum formation is undesirable since it means a loss in rubber content in the latex and possibly also a reduction in quality of foam rubber products made from the latex; in some cases the amount of coagulum formed may be such as to plug the equipment used in its preparation.

It is known from Canadian Patent No. 710,874 assigned to the present assignee, to agglomerate a latex of an oil-resistant rubbery copolymer containing 80% butadiene-1,3 and 20% acrylonitrile by a process employing as an agglomerating agent a material available commercially under the trademark "Carbowax 20M," the particular process comprising a polymerization at about 7° C. to a solids content of 28.0%, the addition of the agglomerating agent thereto, and the subsequent heating of the latex at about 37° C. under a vacuum of about 28 inches of mercury to slowly concentrate it. It was found that such a latex could be concentrated to a solids content (at 12 poises viscosity) of 64.3%. An increase in the proportion of the acrylic acid nitrile component is deemed commercially desirable because of the improved mechanical properties and oil resistance of the polymers, but attempts to produce higher acrylic acid nitrile content materials by the usual commercial processes have not proved successful hitherto, because of mechanical instability of the latices resulting in excessive coagulum formation when the solids level of the latex rose above about 55%.

It is an object of the present invention to provide a new process of preparing aqueous synthetic latices of solids content greater than 55% comprising copolymerised $C_4$-$C_6$ conjugated diolefin hydrocarbon monomer and an acrylic acid nitrile monomer, and wherein the latter monomer is present in proportion from about 25% to about 50%.

In accordance with the present invention there is provided a process for the preparation of a concentrated aqueous latex from a less concentrated aqueous latex comprising a rubbery copolymer including from 50 to 75% proportion by weight of copolymerised $C_4$-$C_6$ conjugated diolefin hydrocarbon monomer and 50% to 25% proportion by weight of a copolymerized acrylic acid nitrile monomer, the process including the step of subjecting the said less concentrated aqueous latex to a heat treatment for a period of from one minute to 48 hours, at a temperature between 40° to 95° C., in the presence of an agglomerating agent comprising a compound having the general formula:

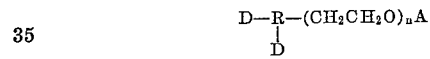

where R is an organic hydrophobic group,

A is H or $R(CH_2CH_2O)_mH$

D is H or $(CH_2CH_2O)_pH$ $n$, $m$, $p$ are each from 23 to 455, and the ratio of R to ethylene oxide chains is from 1:3 to 2:1, the agglomerating agent being present in the proportion of from 0.01 to 1.0 part by weight per 100 parts of the said polymer solids, and the subsequent step of concentrating the heat treated latex to a polymer solids content of greater than 55%.

The less concentrated latex resulting from the heat treatment is sufficiently mechanically stable to be concentrated to the solids content specified, or even higher, which has not been possible hitherto in the absence of such treatment.

The compound employed as the agglomerating agent preferably is a product obtained by reacting a polyoxyethylene glycol with the diepoxide obtained by condensing epichlorhydrin with a polyhydric phenol. The material available commercially at the present time under the trademark "Carbowax 20M" has been found to be an effective agglomerating agent in accordance with the present invention. It is believed to be the reaction product of molecular weight about 15,000–20,000 obtained by chain extending or cross-linking polyoxyethylene glycol of molecular weight about 6000 with the diepoxide formed by the condensation of 2,2-bis-(4-hydroxy phenyl) propane with two mols of epichlorohydrin.

Preferably, the said agglomerating agent is present in the proportion of 0.05 to 0.4 part, more preferably 0.1 to 0.3 part, by weight per 100 parts of polymer solids. Preferably, the temperature of the heat treatment is from 50° to 80° C., more preferably from 60° to 70° C. Preferably, the proportion of the acrylic acid nitrile monomer is from 30% to 50%, the preferred monomer being acrylonitrile. The preferred conjugated diolefin monomer is butadiene-1,3 or isoprene.

The heat treatment may take place in the presence of a dispersing agent which is preferably selected from the potassium and sodium salts of the condensation product of betanaphthalene sulphonic acid with formaldehyde, the amount of such dispersing agent present being from 0.1 to 10.0 parts, preferably 0.2 to 5.0 parts, more preferably 0.5 to 3.0 parts, by weight per 100 parts by weight of polymer solids in the latex. A dispersing material available commercially is sold under the trademark "Daxad."

A convenient method for classifying the concentration of a synthetic latex for purposes of comparison is by measuring the percentage of solids obtained on concentrating or diluting the latex to a viscosity of 12 poises, as measured at 25° C. on a Brookfield Model LVF viscometer using the 3 spindle at 30 r.p.m. This value is referred to as the percent solids at 12 poises.

The progress of the agglomeration process can be conveniently determined by periodic measurement of the surface tension of the liquid-air interface of the latex, the increase in particle size being accompanied by decrease in this parameter. This decrease is believed due to the fact that the increase in particle size by agglomeration is accompanied by an effective decrease in surface area of the particles, so that an increasing proportion of the surface active components enter the aqueous phase and reduce the surface tension. The measurements hereinafter referred to have been carried out at about 25° C., using latices which have been diluted with distilled water to a solids content of 15% by weight. Full chemical agglomeration was considered to have been obtained when the surface tension stopped or almost stopped dropping.

Both the progress of the agglomeration process and the mechanical stability of the latices under consideration can readily be compared by subjecting them to a predetermined high speed agitation for a specific period and measuring the amount of the polymer solids separating from the latex in the form of coagulum as the result of such treatment. In one such test procedure the latex is diluted to 30% solids by weight and passed through an 80 mesh screen. An 80 gram sample of the latex is then subjected to agitation in a cup for 10 minutes by means of a special disc-type agitator rotating at 14,000 r.p.m. The agitated sample is again passed through an 80 mesh screen and the collected polymer dried at about 118° C. under a vacuum of about 25 inches of mercury. Full agglomeration was considered to be obtained when the mechanical stability test resulted in the obtaining of less than 0.2 gram, preferably 0.1 gram, of dried polymer during the second filtering through the 80 mesh screen.

The latices which may be agglomerated by a process in accordance with the present invention are of synthetic copolymers which are essentially rubbery in character, in that they comprise at least 50% by weight of a copolymerised conjugated diolefin hydrocarbon monomer having from 4 to 6 carbon atoms and up to 50% by weight of a copolymerised acrylic acid nitrile monomer. For example, monomers such as butadiene-1,3; 1-methyl butadiene-1,3; 2-methyl butadiene-1,3; and 2,3-dimethyl butadiene-1,3 may be employed as the diolefin and monomers such as acrylonitrile, methacrylonitrile, ethacrylonitrile, propacrylonitrile, methylene glutaronitrile, etc., may be employed as the acrylic acid nitrile type monomer. These latter monomers may conveniently be defined by the general formula

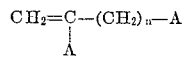

where A is an H, $C_{1-3}$ alkyl, COOR or CN radical and at least one A is CN, R is an organic radical such as a $C_{1-6}$ alkyl and $n$ is 0-3.

Conventionally, the mixture of copolymerisable monomers is emulsified in an aqueous medium by means of an emulsifying agent which can be one or more of a soap (such as an alkali metal salt of a saturated or unsaturated carboxylic acid such as an alkali metal stearate, oleate, etc.), or a rosin acid soap (such as an alkali metal abietate), or other suitable surface active agents (such as the sodium or potassium salts of the condensation product of betanaphthalene sulfonic acid and formaldehyde, alkali metal salts of alkyl aryl sulfonates, ethylene oxide condensates with alkyl phenols etc.). The polymerization is made to take place by the addition of a suitable catalyst at suitably controlled temperatures. Peroxygen catalysts such as persulfates and hydroperoxides are usually employed and the polymerization temperature may vary from about 2–120° C. When the desired degree of polymerization is reached, the reaction is stopped. The unreacted monomers are then usually removed, although agglomeration is obtained with unstripped latex also.

Latices prepared in this manner normally are considered to be in dilute form, having a total solids content of about 15–45% by weight, usually about 30%, and average particle sizes of about 400–1000 or more angstroms. In the absence of the agglomerating agent, they may be concentrated to about 45–50% solids at 12 poises.

The agglomeration step preferably is effected with a solids content of not less than about 30–35%, and some pre-concentration may be required, for example, after the stripping step to overcome any dilution that occurred during that step. In some processes such a pre-concentration step may be taken even further, for example to give a solids content of about 40–45%, for reasons explained hereinafter.

The resulting latex may be agglomerated before or after blending with another rubbery or resinous polymer latex or latices. Blending with oil may also be effected subsequent to the agglomerating step.

After agglomeration the resulting latex or latex blend may be concentrated to more than 60% solids. The process in accordance with the invention is particularly valuable with latices of isoprene/acrylonitrile copolymer since these are particularly sensitive to concentration conditions and polymer coagulum tends to form more readily than, for example, with latices of butadiene-1,3/acrylonitrile copolymer.

The processes of the invention are particularly applicable to polymers having Mooney viscosity values less than 100 (MS-4-100° C.) and preferably in the range 25–90. The Mooney viscosity increases with the proportion of the bound acrylic acid nitrile component in the polymer (and consequently with the hardness of the resulting rubbery material), and corresponding decreases in the average molecular weight of the copolymer may be required to maintain the Mooney value within the desired limits.

Compounds described by the general formula

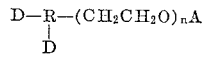

where R is an organic hydrophobic group

A is H or $R(CH_2CH_2O)_mH$
D is H or $(CH_2CH_2O)_pH$
$n$, $m$, $p$ are each 23–455 and the ratio of R to ethylene oxide chains is from 1:3 to 2:1 have been found to have an agglomerating effect. To have a suitable effect the compounds should be soluble in water. The hydrophobic groups designated by R which have been found to be suitable include aromatic diisocyanates, stearoyl, oleoyl, and lauroyl groups, nonyl phenol-toluene di-isocyanate reaction products and bisphenol-epichlorohydrin reaction products. The aromatic hydrophobic groups are preferred since they appear to have better adsorption on the polymer particle surface.

It is interesting to note that no significant agglomerating effect was obtained when polyethylene oxide of molecular weight 20,000 and containing no hydrophobic organic group was tested.

The preferred class of agglomerating agents may be prepared by first reacting epichlorohydrin with a polyhydric phenol to form a diepoxy polymer where the epoxy groups are in the terminal positions on the polymer molecules, and then reacting this diepoxide with a polyoxyethylene glycol to form the agglomerating agent. The polyhydric phenol is preferably a p,p¹-alkylidene diphenol such as 2,2-bis(4-hydroxy phenyl) propane, 2,2-bis(4-hydroxy phenyl) butane or 2,2-bis(4-hydroxy phenyl) pentane, and the preferred polyoxyalkylene glycol is polyoxyethylene glycol having a molecular weight of about 6000. The preferred agglomerating agent is prepared by reacting epichlorohydrin with 2,2-bis(4-hydroxy phenyl) propane to form a diepoxide in which one mole of the 2,2-bis(4-hydroxy phenyl) propane is combined with two moles of epichlorohydrin, and then reacting this diepoxide with polyoxyethylene glycol (molecular weight about 6000) to form the agglomerating agent. A material referred to above and available commercially under the trademark "Carbowax 20M" has been found to be a particularly effective agglomerating agent.

The agglomerating agent is preferably added to the unconcentrated latex in the form of an aqueous solution thereof, and it is preferred to include in such solution a dissolved dispersing agent of the chemical composition and in the proportions referred to above. This dispersing agent functions to control the agglomerating effect and thus prevent excessive coagulum formation during the concentration step, and also to minimize the degree of creaming after the latex has been concentrated. The use of a dispersing agent can be avoided by use of the more dilute solutions of the agglomerating agent, but it may then be found that the unconcentrated latex is of lower solids content than is preferred for the heat treatment, so that an additional preconcentration step may be required. It is also possible to add the agglomerating agent solution to the reactor in which the latex is being prepared, such addition being made prior to or after the initiation of the polymerization reaction.

There is some tendency towards coagulum when the aqueous solution of the agglomerating agent is added to the latex, and this may be overcome by the addition of a small amount i.e. 0.1–10 parts and preferably 0.5–5.0 parts, based on the polymer content, of extra emulsifier to the latex, the addition being made either directly to the latex or with the agglomerating agent solution. The addition of excessively large amounts of extra emulsifier is undesirable since it affects the foaming and gelling properties of the concentrated latex, and changes in the compounding recipe are required to retain optimum properties in the foamed latex. The addition of potassium oleate or a sodium salt of the condensation product of beta-naphthalene sulfonic acid with formaldehyde has been found to be particularly effective.

In the preparation of the aqueous solution of the agglomerating agent it was found desirable to agitate the solution for a considerable period of time (e.g. about 40–50 minutes) to ensure full solution, and thereafter to add the dispersing agent. The solution added to the latex preferably with the latter at temperatures between about 25° C. and 35° C. It is usually found there is a drop of about 0.5 in the pH of the latex, during the agglomeration process, and suitable prior adjustments may be made to the latex pH to obtain the agglomerated latex within a desired pH range. The solution is added to the latex with good agitation, which may be continued for a short period (e.g. 5–10 minutes) before beginning the heat treatment. Such agitation will usually be continued during the heat treatment.

The temperature at which the heat treatment is carried out, the length of time taken by the treatment, the concentration of the agglomerating agent and the concentration of the dispersing agent are interrelated variables whose values for a particular process can readily be determined by experiment. In general, the temperature to be employed may be determined primarily by the equipment available for carrying out the process, but the use of lower concentrations of the agglomerating agent will permit the use of higher temperatures without the formation of excessive coagulum, and vice versa. The heating time can be decreased as the temperature is increased and/or as the concentration of the agglomerating agent is increased, and may be within the limits specified of one minute to 48 hours, depending upon the rate at which it is desired that the agglomeration should take place. Normally a very rapid agglomeration should be avoided. It is found that the heating time and/or concentration of the agglomerating agent can be decreased as the solids content is increased, and for this reason it may be preferred to employ the preconcentration step described above to a high solids content just short of excessive coagulum formation or creaming.

The point at which the heat treatment should be discontinued can be determined by either or both of the surface tension measurement method and the mechanical stability measurement method described above.

In the initial stages of the treatment the mechanical stability is poor with medium surface tension values; it is at present believed this may be due to a considerable degree of particle clustering but with relatively little particle coalescence and consequent medium particle coverage by the emulsifying agent. After sufficient heat treatment the mechanical stability becomes very good and the surface tension decreases considerably, believed due to an increase in particle coalescence with consequent decrease in clustering and increasing coverage by the emulsifier, increasing amounts of the emulsifier now entering the aqueous phase. When the latex is fully agglomerated the surface tension is at a minimum and the mechanical stability has increased to the desired extent. Thus, the treatment can be terminated when periodic checks of the surface tension show that it has stopped or almost stopped decreasing, or when the amount of coagulum produced by periodic checks has decreased to 0.2 gram. The agglomerated latex is then concentrated to the desired solids content.

Foam rubbers made from concentrated latices prepared in accordance with the invention were found to have improved oil resistance and stress strain properties, as compared with copolymers having less than 25% bound acrylic acid nitrile. The dry polymer also exhibits excellent stress-strain properties rendering it commercially attractive for use in the preparation of rubber thread made by the latex process, and in latex film preparation and latex dipping processes.

The following examples are given to illustrate the invention more fully.

Example 1

A monomer mixture of 65 parts by weight of isoprene and 35 parts of acrylonitrile was emulsified in water containing 3.0 parts by weight of dissolved sodium dodecylbenzene sulfonate emulsifier per 100 parts of total monomers. Polymerization was initiated and carried out at 13° C. (55° F.) to a conversion of 89% by the addition of di-isopropylbenzene hydroperoxide initiator and an activator solution containing ferrous sulfate heptahydrate and sodium formaldehyde sulfoxylate reducing agents. The rubbery polymer in the resulting latex had a bound acrylonitrile content of 32.7 weight percent and an MS–4–100° C. Mooney viscosity of 42. The latex had a total solids content of 28.2 weight percent, a surface tension at 15% solids of 45.5 dynes/centimeter, an 80 mesh coagulum content of 0.02% by weight and an H.S.A. (high speed agitator) stability of 0.46 gram. The latex could be concentrated to a 12 poise solids content of 48.7%.

Various amounts of aqueous solutions of "Carbowax 20M" agglomerating agent and "Daxad 11 SPN" emulsifier were added to samples of the unconcentrated latex at room temperature (25° C.), and after thorough blending the mixtures were heated for various times and tested as indicated in Table 1.

TABLE 1

| Sample No. | Carbo wax, parts | Daxad, parts | Time, hrs. | Temp., ° C. | S.T. at 15% solids | M.S. at 28% solids |
|---|---|---|---|---|---|---|
| 1 | 0.10 | 2.0 | 18 | 60 | 28.7 | 0.50 |
| 2 | 0.20 | 2.0 | 18 | 25 | 34.4 | 3.21 |
| 3 | 0.20 | 2.0 | 2 | 50 | 25.3 | 0.73 |
| 4 | 0.20 | 2.0 | 18 | 50 | 28.4 | 0.30 |
| 5 | 0.20 | 2.0 | 18 | 25 | 35.7 | 4.16 |
| 6 | 0.20 | 2.0 | 18 | 60 | 24.9 | 0.12 |
| 7 | 0.25 | 2.0 | 2 | 60 | 28.4 | 0.17 |
| 8 | 0.30 | 2.0 | 18 | 25 | 31.4 | |
| 9 | 0.30 | 2.0 | 18 | 50 | 25.1 | 0.10 |
| 10 | 0.30 | 2.0 | 2 | 60 | 26.6 | 0.09 |

S.T.=Surface tension at 15% solids.
M.S.=Mechanical stability at 28% solids.

The high surface tension and low mechanical stability results for Samples Nos. 2, 5 and 8 show that at room temperature the agglomeration is not complete even after 18 hours, while the lower results after only 2 hours heating at 50 or 60° C. in the presence of the Carbowax 20M agglomerating agent indicate that a very high degree of agglomeration and stability has been attained. There is danger of excessive coagulum formation if concentration is attempted on the room temperature incompletely agglomerated latex samples which have not yet passed through the region of instability associated with the agglomeration step.

The heat treated latices of Samples 6 and 7 were vacuum concentrated at about 45° C. It was found that they could be concentrated at about 45° C. It was found that they could be concentrated to 64.7% and 62.9% solids at 12 poises respectively, with the mechanical stabilities of the concentrated latex samples being excellent at 0.20 gram and 0.05 gram respectively.

A comparison of Samples 1, 6 and 10 indicate the decreasing surface tension and increasing mechanical stability obtained with an increase of concentration of the "Carbowax 20M" from 0.10 to 0.30. The change in these parameters is not progressive with Sample 10 because of the abrupt decrease in time of the heat treatment from 18 hours for the preceding samples to 2 hours for this sample.

Example 2

Monomer mixtures of butadiene-1,3 and acrylonitrile of respective ratios 60/40 and 68/32 were polymerized as in Example 1, except that 3.50 parts of potassium oleate was used as an emulsifier together with 0.10 part of Daxad 11 and the modifier level was adjusted to give the latices described in Table 2.

TABLE 2

| Latex No. | A | B | C |
|---|---|---|---|
| Butadiene-1,3 (percent) | 60 | 60 | 68 |
| Acrylonitrile (percent) | 40 | 40 | 32 |
| Total solids (percent) | 47.2 | 34.1 | 35.6 |
| Surface tension at 15% solids (dynes/cm.) | 44.7 | 41.8 | 41.0 |
| Mechanical stability (grams) | 2.21 | 0.56 | 0.79 |
| Bound acrylonitrile (percent) | 38.8 | 39.6 | 33.7 |
| Mooney viscosity (MS-4-100° C.) | 60 | 54 | 85 |

Samples of each of the three latices were diluted to 30% solids and heat treated under varying conditions in the presence of the Carbowax 20M agglomerating agent and Daxad 11 SPN dispersing agent at a pH of 10. Surface tension and mechanical stability were then determined. The results are recorded in Table 3.

TABLE 3

| Latex | Sample No. | Carbo, parts | Daxad, parts | H.T. time, hrs. | Temp., ° C. | S.T. at 15% solids | M.S. at 30% solids |
|---|---|---|---|---|---|---|---|
| A | 1 | 0.20 | 0.5 | 18 | 25 | 38.5 | 6.88 |
|   | 2 | 0.20 | 0.5 | 2 | 70 | 30.9 | 0.10 |
|   | 3 | 0.20 | 0.5 | 18 | 70 | 30.4 | 0.03 |
|   | 4 | 0.20 | 0.5 | 42 | 70 | 30.4 | 0.03 |
|   | 5 | 0.10 | 1.0 | 18 | 25 | 40.3 | 1.87 |
|   | 6 | 0.10 | 1.0 | 18 | 70 | 32.8 | 0.18 |
|   | 7 | 0.15 | 1.0 | 2 | 70 | 31.7 | 0.20 |
|   | 8 | 0.15 | 1.0 | 6 | 70 | 30.8 | 0.06 |
|   | 9 | 0.20 | 1.0 | 18 | 25 | 39.2 | 5.87 |
|   | 10 | 0.20 | 1.0 | 18 | 50 | 32.2 | 0.37 |
|   | 11 | 0.20 | 1.0 | 0.003 | 95 | 31.0 | 2.17 |
|   | 12 | 0.20 | 1.0 | 0.03 | 95 | 30.2 | 0.03 |
|   | 13 | 0.20 | 1.0 | 0.25 | 95 | 29.7 | 0.01 |
| B | 14 | 0.05 | 1.0 | 18 | 25 | 38.6 | 0.23 |
|   | 15 | 0.05 | 1.0 | 18 | 70 | 32.2 | 1.35 |
|   | 16 | 0.10 | 1.0 | 18 | 60 | 35.4 | 0.12 |
|   | 17 | 0.10 | 1.0 | 2.25 | 70 | 34.3 | 0.05 |
|   | 18 | 0.10 | 1.0 | 1.05 | 90 | 31.1 | 0.02 |
|   | 19 | 0.10 | 1.0 | 0.03 | 95 | 30.2 | 0.03 |
|   | 20 | 0.15 | 1.0 | 18 | 25 | 39.8 | 0.73 |
|   | 21 | 0.15 | 1.0 | 18 | 60 | 34.2 | 0.03 |
|   | 22 | 0.20 | 1.0 | 2.25 | 70 | 32.9 | 0.01 |
|   | 23 | 0.20 | 1.0 | 18 | 70 | 31.3 | 0.01 |
| C | 24 | 0.10 | 1.0 | 18.5 | 70 | 29.4 | 0.52 |
|   | 25 | 0.15 | 1.0 | 2 | 70 | 29.5 | 0.09 |
|   | 26 | 0.15 | 1.0 | 17.85 | 70 | 29.0 | 0.02 |
|   | 27 | 0.20 | 1.0 | 2 | 70 | 29.2 | 0.02 |

Carbo=Carbowax 20M; Daxad=Daxad 11 SPN; H.T.=Heat treatment; S.T.=Surface tension; M.S.=Mechanical stability.

As with Table 1, the generally higher surface tension and mechanical stability values at room temperature (25° C.) show that while agglomeration is taking place it is not yet complete, and the latex has not yet passed through the region of instability.

The lower values obtained after the heating step has been completed indicate that agglomeration is essentially complete and the corresponding latex is sufficiently stable for concentration under relatively high shear conditions. As an example of this, samples 18 and 26 were concentrated for 7 and 6 hours respectively at about 45–50° C. It was found that sample 18 could be concentrated to a 12 poise solids of 62.3% and the mechanical stability of the concentrated latex was 0.01. For sample 26 the respective values were 63.2 and 0.01, all of which are considered to be excellent.

Example 3

A sample of latex B from Example 2 was diluted to 30% solids and blended with 0.15 part of Carbowax 20M and 1.0 part of Daxad 11 SPN per 100 parts of polymer. The latex was then subjected to a heat treatment where the temperature was allowed to gradually rise from 25° C. to 70° C. over a period of 20 hours, with the surface tension and mechanical stability being determined periodically. The results are recorded in Table 4.

TABLE 4

| Heat treatment time (hrs.) | Temp. °C. | Surface tension at 15% solids | Mechanical stability at 30% solids |
|---|---|---|---|
| 0.1 | 25 | 40.5 | 0.56 |
| 8 | 45 | 37.1 | 0.57 |
| 16 | 60 | 35.4 | 0.07 |
| 18 | 73 | 33.5 | 0.02 |
| 20 | 70 | 32.8 | 0.02 |

A portion of the latex was concentrated under high shear conditions to a 12 poise solids content of 60.1%. The concentrated latex had a surface tension of 31.7 dynes per centimeter and a mechanical stability of 0.24 gram.

A sample of the concentrated latex was compounded, frothed and vulcanized into a latex foam rubber. Various properties of the foam rubber were determined, and the resultant data are summarized in Table 5.

TABLE 5

Compounding:
Latex solids _____ 100
Potassium oleate _____ 0.75
Dresinate 214 (rosin soap) _____ 0.5
Zinc diethyl dithiocarbamate _____ 1.0
Zinc-2-mercaptobenzothiazole _____ 1.0
Sulfur _____ 2.0
Polyalkylpolyphenol antioxidant _____ 1.25
Sensitizer (reaction product of ethyl chloride, formaldehyde and ammonia) _____ 0.7
Frothing:
Potassium oleate _____ 0.1
Sensitizer (as above) _____ 0.3
Zinc oxide _____ 3.0
Sodium silicofluoride _____ 3.3
Gel Time (minutes) _____ 6.0
Cure time at 100° C. (minutes) _____ 25
Appearance of foam rubber _____ very good
Unaged properties:
Compression resistance at 6.25 pounds per cubic foot density (p.s.i.) _____ 0.76
Tensile strength at density of 6.25 (p.s.i.) ____ 13.0
Elongation, percent _____ 415
Volume shrinkage (percent) _____ 12.1
Compression set
22 hrs. at 70° C., percent _____ 4.6
72 hrs. at 99° C., percent _____ 22.5
After oil immersion:
Oil swelling, percent _____ 2.1
Oil pick-up at density of 6.25, percent _____ 760
Compression set, 72 hrs. at 99° C., percent ___ 22.4

Tensile strength and elongation are outstanding, as is the low swelling on immersion in oil.

Example 4

A monomer mixture of 60 parts by weight of butadiene-1,3 and 40 parts by weight of methacrylonitrile was polymerized in aqueous emulsion to form a latex of a rubbery copolymer of the above monomers. The copolymer had a raw polymer Mooney viscosity (MS-4'-100° C.) of 55 while the latex after stripping, was characterized by a total solids content of 37.1 weight percent, a surface tension at 15% solids of 41.0 dynes per centimeter, an 80 mesh coagulum content of less than 0.01 weight percent and a mechanical stability (as received) of 0.53 gram. After heat-treating under good agitation for 2.4 hours at about 70° C. in the presence of 0.15 parts of Carbowax 20M agglomerating agent and 1.0 part of Daxad 11 SPN emulsifier per 100 parts of latex solids, the latex was characterized by a surface tension at 15% solids of 32.5 dynes per centimeter, an 80 mesh coagulum content of 0.13 weight percent and a mechanical stability of 0.06. The treated latex was concentrated to a 12 poise solids content of 58.1 weight percent with the 80 mesh coagulum being 0.03 weight percent and the mechanical stability at 42% solids being 0.17 gram.

The concentrated latex was compounded, foamed and vulcanized into a latex foam rubber which exhibited excellent stress-strain properties and oil resistance.

What we claim is:

1. A process for the preparation of a concentrated aqueous latex from a less concentrated aqueous latex comprising a rubbery copolymer including from 50 to 75% proportion by weight of copolymerized $C_4$–$C_6$ conjugated diolefin hydrocarbon monomer and 50 to 25% proportion by weight of a copolymerized acrylic acid nitrile monomer, the process comprising as a first step, subjecting the said less concentrated aqueous latex to a heat treatment for a period of from one minute to 48 hours, at a temperature between 40° C. and 95° C., the heating time being decreased as the temperature is increased, in the presence of an agglomerating agent comprising a compound having the general formula:

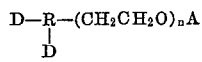

where R is an organic hydrophobic group, A is H or $R(CH_2CH_2O)_mH$, D is H or $(CH_2CH_2O)_pH$, $n$, $m$, $p$ are each from 23 to 455, and the ratio of R to ethylene oxide chains is from 1:3 to 2:1, the agglomerating agent being present in the proportion of from 0.01 to 1.0 part by weight per 100 parts of the said polymer solids, whereby agglomeration is achieved and as a subsequent second step, vacuum concentrating the heat treated latex to a polymer solids content of greater than 55%.

2. A process as claimed in claim 1, wherein the said agglomerating agent is a product obtained by reacting a polyoxyethylene glycol with the diepoxide obtained by condensing epichlorohydrin with a polyhydric (alcohol) phenol.

3. A process as claimed in claim 1, wherein the said agglomerating agent is present in the proportion of from 0.05 to 0.4 part by weight per 100 parts of the polymer solids.

4. A process as claimed in claim 3, wherein the said agglomerating agent is present in the proportion of from 0.1 to 0.3 part by weight per 100 parts of the polymer solids.

5. A process as claimed in claim 1, wherein the heat treatment is effected at a temperature between 50° C. and 80° C.

6. A process as claimed in claim 5, wherein the heat treatment is effected at a temperature between 60° C. and 70° C.

7. A process as claimed in claim 1, wherein the heat treatment takes place in the presence of a dispersing agent selected from the potassium and sodium salts of the condensation product of beta-naphthalene sulfonic acid with formaldehyde, the amount of dispersing agent present being from 0.1 to 10.0 parts by weight per 100 parts of polymer solids in the latex.

8. A process as claimed in claim 7, wherein the amount of dispersing agent present is from 0.2 to 5.0 parts by weight per 100 parts of polymer solids in the latex.

9. A process as claimed in claim 8, wherein the amount of dispersing agent present is from 0.5 to 3.0 parts by weight per 100 parts of polymer solids in the latex.

10. A process as claimed in claim 1, wherein the rubbery copolymer includes from 50% to 70% proportion by weight of copolymerised butadiene-1,3 monomer and 50% to 30% proportion by weight of copolymerised acrylonitrile.

11. A process as claimed in claim 1, wherein the rubbery copolymer includes from 50% to 70% proportion by weight of copolymerised isoprene monomer and 50% to 30% by weight of copolymerized acrylonitrile.

12. A process as claimed in claim 1, wherein the acrylic acid nitrile monomer is defined by the general formula

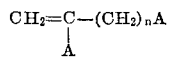

where A is an H, $C_{1-6}$ alkyl, COOR or CN radical and at least one A is a CN radical, R is an organic radical and $n$ is 0–3.

13. A process as claimed in claim 1 wherein the rubbery copolymer includes from 50% to 70% proportion by weight of copolymerised butadiene-1,3 and 50% to 30% by weight of copolymerized methacrylonitrile.

References Cited
FOREIGN PATENTS
991,394  5/1965  Great Britain.

MURRAY TILLMAN, *Primary Examiner.*

W. J. BRIGGS, *Assistant Examiner.*